April 19, 1932. A. E. NORTHUP 1,854,714
REAR SIDES AND BACK PANEL FORMED WITH INTEGRAL APRON
Filed Feb. 28, 1931 3 Sheets-Sheet 1
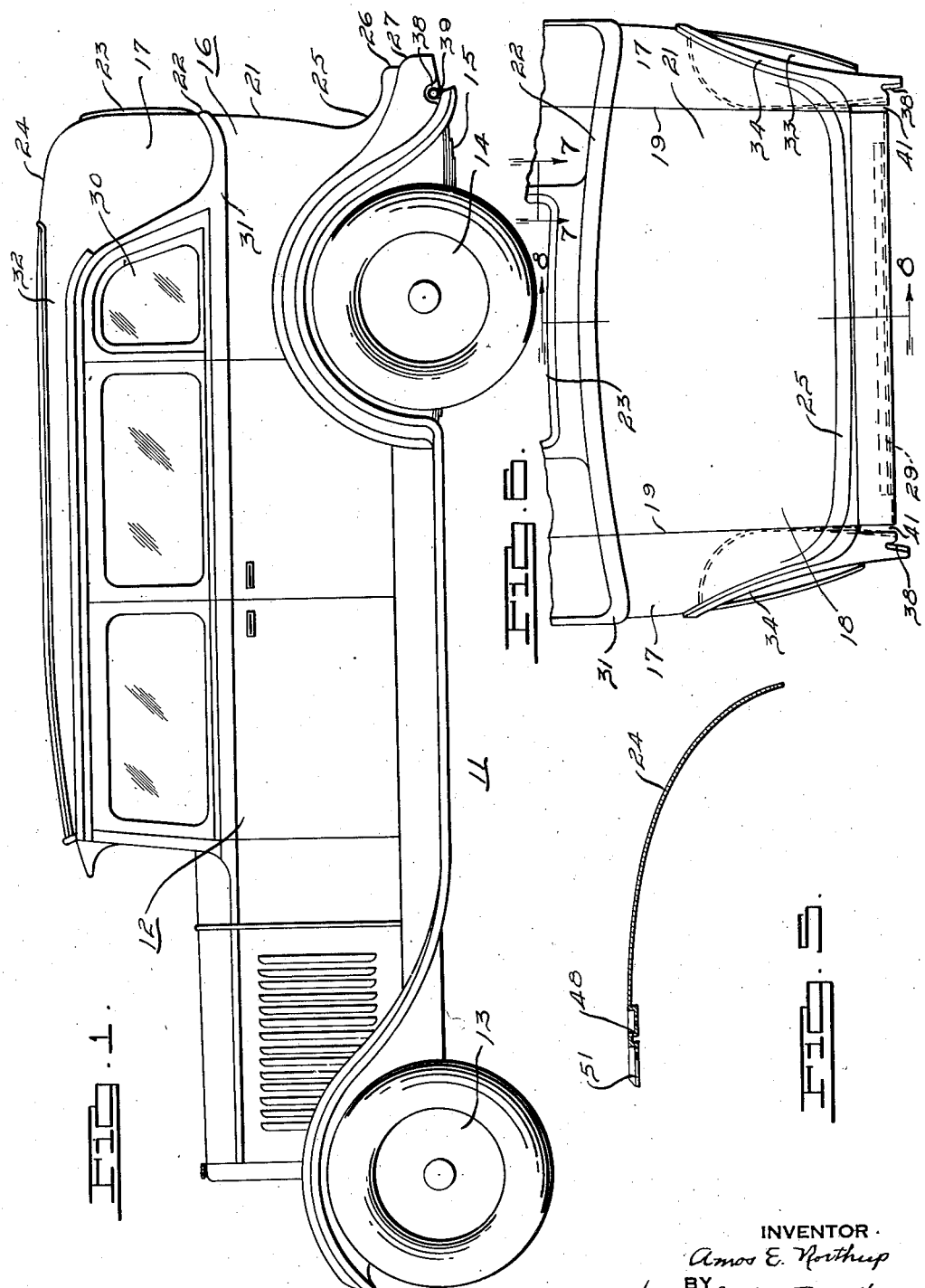
INVENTOR
Amos E. Northup
BY
ATTORNEY April 19, 1932.  A. E. NORTHUP  1,854,714
REAR SIDES AND BACK PANEL FORMED WITH INTEGRAL APRON
Filed Feb. 28, 1931   3 Sheets-Sheet 2
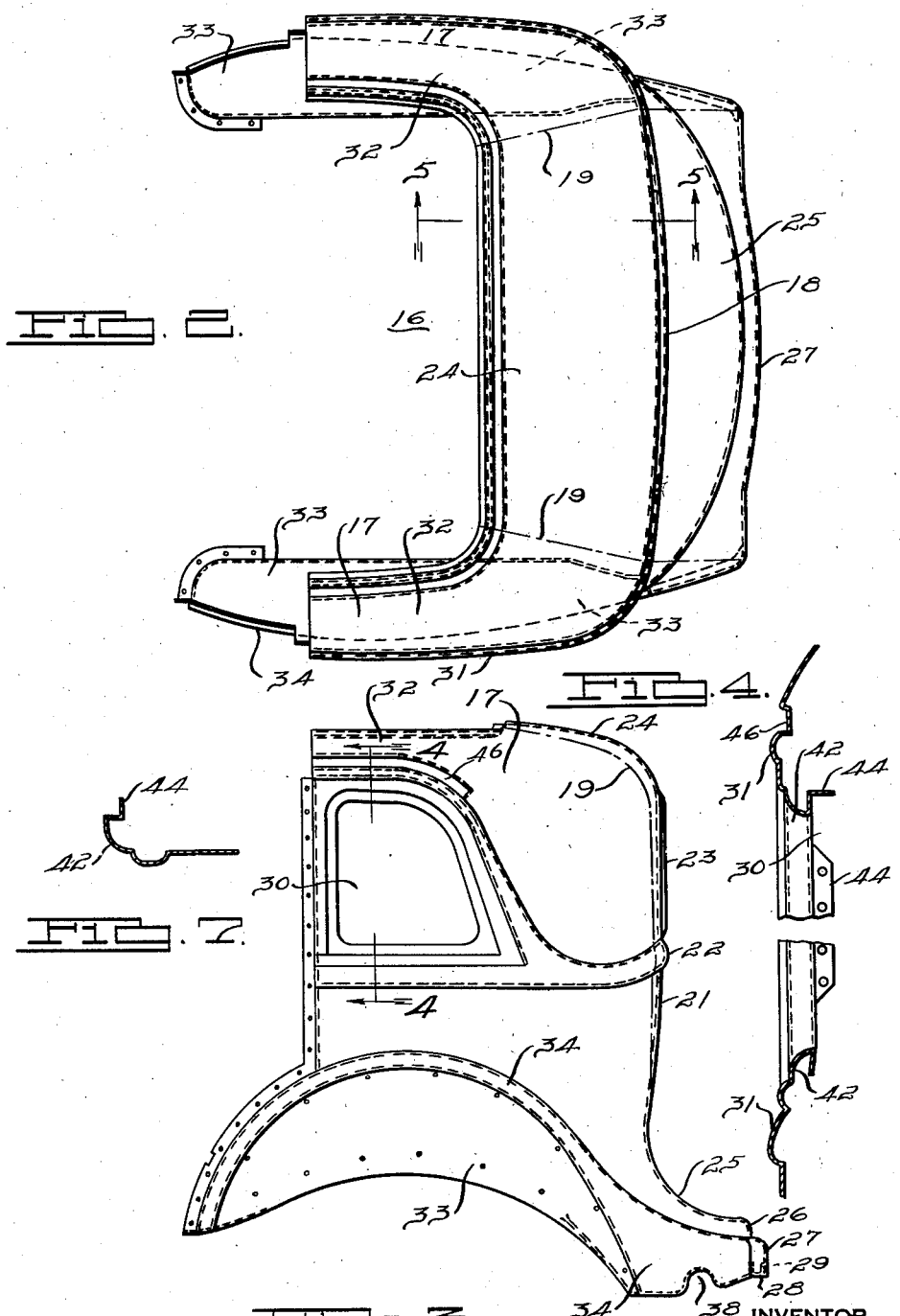

April 19, 1932.   A. E. NORTHUP   1,854,714
REAR SIDES AND BACK PANEL FORMED WITH INTEGRAL APRON
Filed Feb. 28, 1931   3 Sheets-Sheet 3
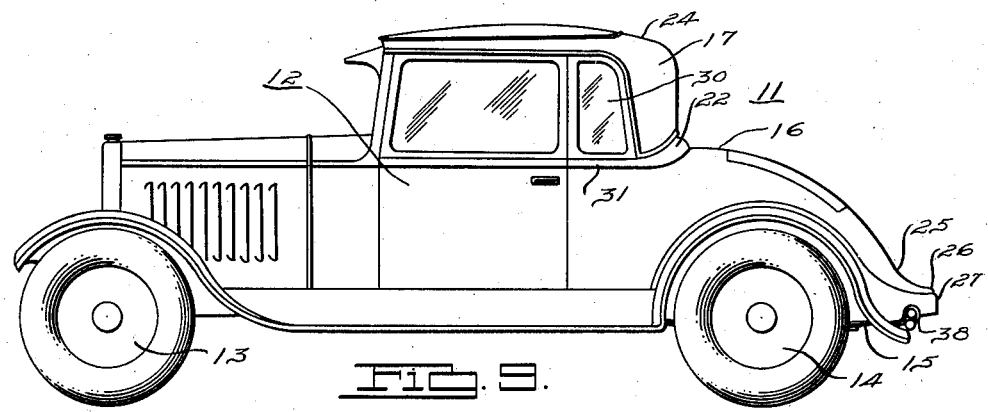
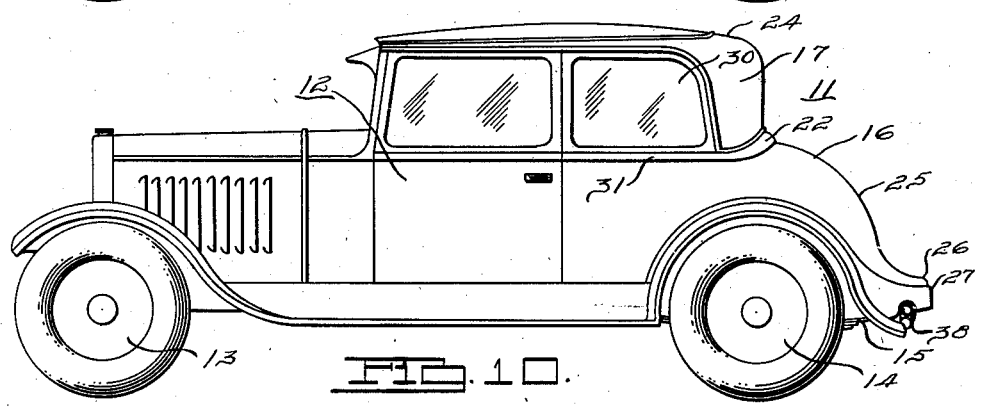
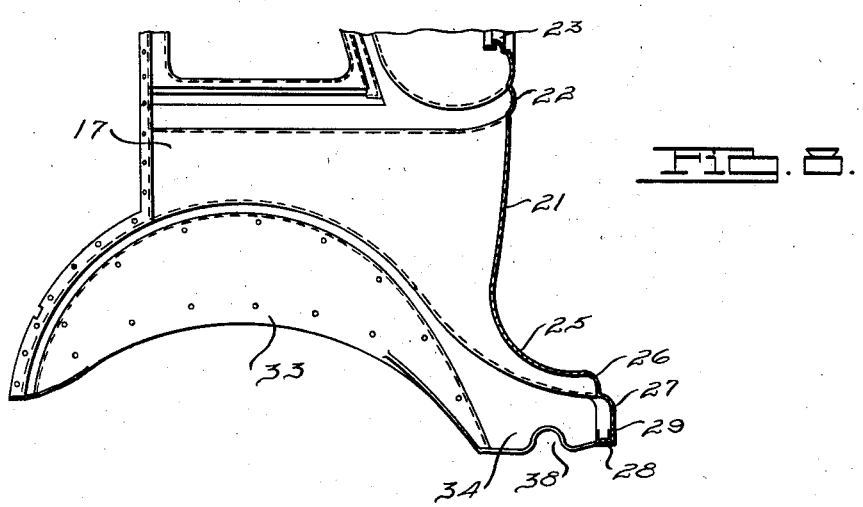
INVENTOR
Amos E Northup
BY
Harness Dickey Pierce & Hann
ATTORNEY Patented Apr. 19, 1932                                                   1,854,714

UNITED STATES PATENT OFFICE

AMOS E. NORTHUP, OF DETROIT, MICHIGAN, ASSIGNOR TO THE MURRAY CORPORATION OF AMERICA, A CORPORATION OF DELAWARE

REAR SIDES AND BACK PANEL FORMED WITH INTEGRAL APRON

Application filed February 28, 1931. Serial No. 518,972.

My invention relates to vehicle bodies and particularly to the rear panel sections thereof.

It has been the practice, heretofore, to stop the rear panel of a vehicle body at the lower edge of the body frame, leaving exposed unsightly portions of the chassis frame, springs and rear axle. It has also been the practice where gas tanks are mounted at the rear of the body to provide separate covers or shields for their protection.

In practicing my invention, I extend the rear and side panels of a vehicle body rearwardly and downwardly to constitute an apron for covering the fuel tank, and hiding from view the rear portion of the chassis, the springs and the upper parts of the rear axle assembly. By having the chassis, springs and rear axle thus hidden from view by the body paneling, I provide a finish appearance to the rear portion of the vehicle never heretofore attained, and a measure of protection for such parts.

It is accordingly, one object of my invention to extend the body paneling rearwardly and downwardly to afford cover for the fuel tank, the rear portion of the chassis frame and the springs which support the rear portion of the body on the rear axle housing.

Another object of my invention is to provide a rear metal panel section for a vehicle body which comprises side and rear panels which are so formed and joined together as to provide a downwardly presenting integral apron symmetrically and ornamentally covering the unsightly portions of the frame and springs at the rear and rear sides of the vehicle.

A further object of my invention is to provide an integral apron on the rear panel section of a vehicle body which will cover and protect the fuel tank.

Numerous other objects and features of novelty of my invention, will be either specifically pointed out or will become apparent when referring, for a better understanding of my invention, to the following description in conjunction with the drawings wherein:

Fig. 1 is a view, in elevation, of a vehicle of the sedan type embodying features of my invention, Fig. 2 is a top plan view of the rear panel section illustrated in Fig. 1 before being assembled on the body, Fig. 3 is a side view, in elevation, of the structure shown in Fig. 2, Fig. 4 is an enlarged sectional view of the structure shown in Fig. 3 taken along the line 4—4 thereof, Fig. 5 is an enlarged broken sectional view of the structure shown in Fig. 2, taken on line 5—5 thereof, Fig. 6 is a broken rear view, in elevation, of the structure shown in Fig. 3, Fig. 7 is an enlarged sectional view of the structure shown in Fig. 6, taken along the line 7—7 thereof, Fig. 8 is a sectional view, of the structure shown in Fig. 6 taken along the line 8—8 thereof, Fig. 9 is a side view, in elevation, of a coupé model of the vehicle shown in Fig. 1 embodying the features of my invention, and Fig. 10 is a side view, in elevation, of a four passenger coupé model of the vehicle shown in Fig. 1 embodying the features of my invention.

While I have illustrated several automobile models embodying features of my invention, I have illustrated specifically and am about to describe the features of novelty pertaining to the sedan model disclosed in Fig. 1, as the novelty of the invention is the same in all three models, the structures differing only in dimension and shape of panels to conform with the specific body model.

Referring particularly to Figs. 2, 3, and 6, I have disclosed a side and rear-panel section 16 of the automobile 11 as comprising two oppositely disposed pressed-metal side panels 17 and a rear pressed-metal panel 18 which are butt-welded together at seams 19 to constitute a unit member. The rear panel 18 comprises a vertical portion 21 having a bead 22 and window 23 formed therein and is provided at its upper and lower end with oppositely curved extending portions 24 and 25 respectively.

The curved portion 24 on the upper end of the rear panel 18 joins the top covering and forms the rear section of the roof. The lower curved portion 25 of the rear panel 18 constitutes the main body of the apron and may be offset at 26 for ornamental and reinforcing effect, and is provided with a downwardly extending portion 27. The lower edge of portion 27 is bent inwardly and upwardly at 28 to constitute a channel in which a reinforcing channel 29 may be secured.

The side panels 17 contain a bead 31 which is a continuation of the bead 22 of the rear panel and which extends upwardly and forwardly to encompass the window opening 30 of the side panels. The top portion of the panel is curved inwardly at 32 to provide quarter roof panels, to the inner edges of which the roof covering may be secured. The inwardly curved portions 32 of the side panels constitute extensions of the rear panel roof section 24.

The lower portions of the side panels 17 are offset inwardly to form wheel-housings 33, the junction of which and the finished portion of the side panels comprise outwardly pressed beads 34 which extend downwardly and rearwardly to join the depending portion 27 of the rear panel 18 and to provide a side apron to the rear of the wheel housings. The portions of the side panels 17 above the surface 34 extend rearwardly and are butt-welded along seams 19 to the rear panel. A depending apron is thereby provided which extends rearwardly from the lower edge of the body to provide a cover and shield for a fuel tank and which conceals the projecting ends of the springs at the rear and sides as well as the rear end of the chassis frame and at least the upper parts of the rear axle assembly which are always unsightly. A finished appearance is provided for the lower rear end of the car which is consonant with the general body design and with the finished upper parts thereof. Apertures 38 are provided in the lower rear sides of the apron to provide access to the spring shackles, while slots 41 are provided in the depending flange 27 for letting bumper brackets through to the chassis frame.

Fig. 4, illustrates the formation of the window reveals 42, attachment flanges 44 of the side window openings, and the inset channel 46 in which drip molding may be secured.

Fig. 7 illustrates the formation of the window reveals 42 and attachment flanges 44 of the rear window 23.

In Fig. 5 I have shown a section through the roof 24 of the rear panel 18 which discloses channels 48 and flange 51 to which the roof covering material may be secured.

It will thus be seen that I have provided a finish panel for the rear portion of an automobile which comprises an apron projecting downwardly and outwardly from the rear lower portion of the body to cover and shield the fuel tank and to cover and hide from view the rear portions of the springs and chassis and rear axle assembly. The apron is integral with the rear and the side panels and is formed in the same stamping operations, after which the panels are welded together to constitute the rear panel unit.

While I have described and illustrated but a single embodiment of my invention it is to be understood by those skilled in the art that many changes, omissions, additions and substitutions may be made therein without departing from the spirit and scope of my invention as set forth in the accompanying claims.

I claim as my invention:

1. A pressed metal section of a vehicle body including right, left and rear pressed metal panels welded together to constitute a unit member, said panels having integral extensions forming a cover for the chassis frame and springs at the rear end of the body.

2. A pressed metal section for a vehicle body including right, left and rear pressed metal panels welded together to constitute a unit member, the rear panel having an integral rearwardly and downwardly extending portion which joins with like extensions on the side panels for providing a downwardly presenting cover apron at the rear end and rear sides of the body.

3. A cover apron for the rear portion of the rear and side sections of a metal sheathed vehicle body which comprises projecting integral extensions of the rear and rear quarter panels of such configuration and dimensions as to cover the rear end portion of the frame of the vehicle.

4. A cover apron for the lower portion of the rear and side sections of a metal sheathed vehicle body which comprises projecting integral extensions of the rear and rear quarter panels of such configuration and dimensions as to cover the rear end portion of the frame of the vehicle and the rear ends of the supporting springs.

5. A cover apron for the lower portion of the rear and side sections of a metal sheathed vehicle body which comprises projecting integral extensions of the rear and rear quarter panels of such configuration and dimensions as to cover the rear end portion of the frame of the vehicle and the rear end of the supporting springs and the fuel tank.

6. A cover apron for the lower portion of the rear and side sections of a metal sheathed vehicle body which comprises projecting integral extensions of the rear and rear quarter panels of such configuration and dimension as to provide a shield and cover for a fuel tank positioned at the rear end of the body.

7. A cover apron for the lower portion of the rear and side sections of a metal sheathed vehicle body which comprises projecting integral extensions of the rear and rear quarter panels rearwardly and downwardly in such configuration and dimensions as to cover the rear end portion of the frame of the vehicle, the fuel tank, and the spring shackles.

8. The combination with a vehicle body and a chassis which extends rearwardly and beyond the rear plane of said body, of an apron formed integrally with the rear and rear quarter body panel and extending rearwardly and downwardly and providing a cover for the rearwardly extending portion of said chassis.

9. The combination with a vehicle body, a chassis and springs which extend rearwardly beyond the rear plane of said body, of an apron formed integrally with the rear and rear quarter body panel and extending rearwardly and downwardly and providing a cover for the rearwardly extending portion of said chassis and springs.

10. The combination with a vehicle body and a chassis, springs and fuel tank which extends rearwardly beyond the rear plane of said body, of an apron formed integrally with the rear and rear quarter body panels and extending rearwardly and downwardly and providing a cover for the rearwardly extending portion of said chassis, springs and fuel tank.

AMOS E. NORTHUP.